April 5, 1960  R. P. HUMPHREY  2,931,475
FLUID PRESSURE ACTUATED CLUTCH WITH TILTABLE PLATE
Filed Feb. 26, 1958  3 Sheets-Sheet 1
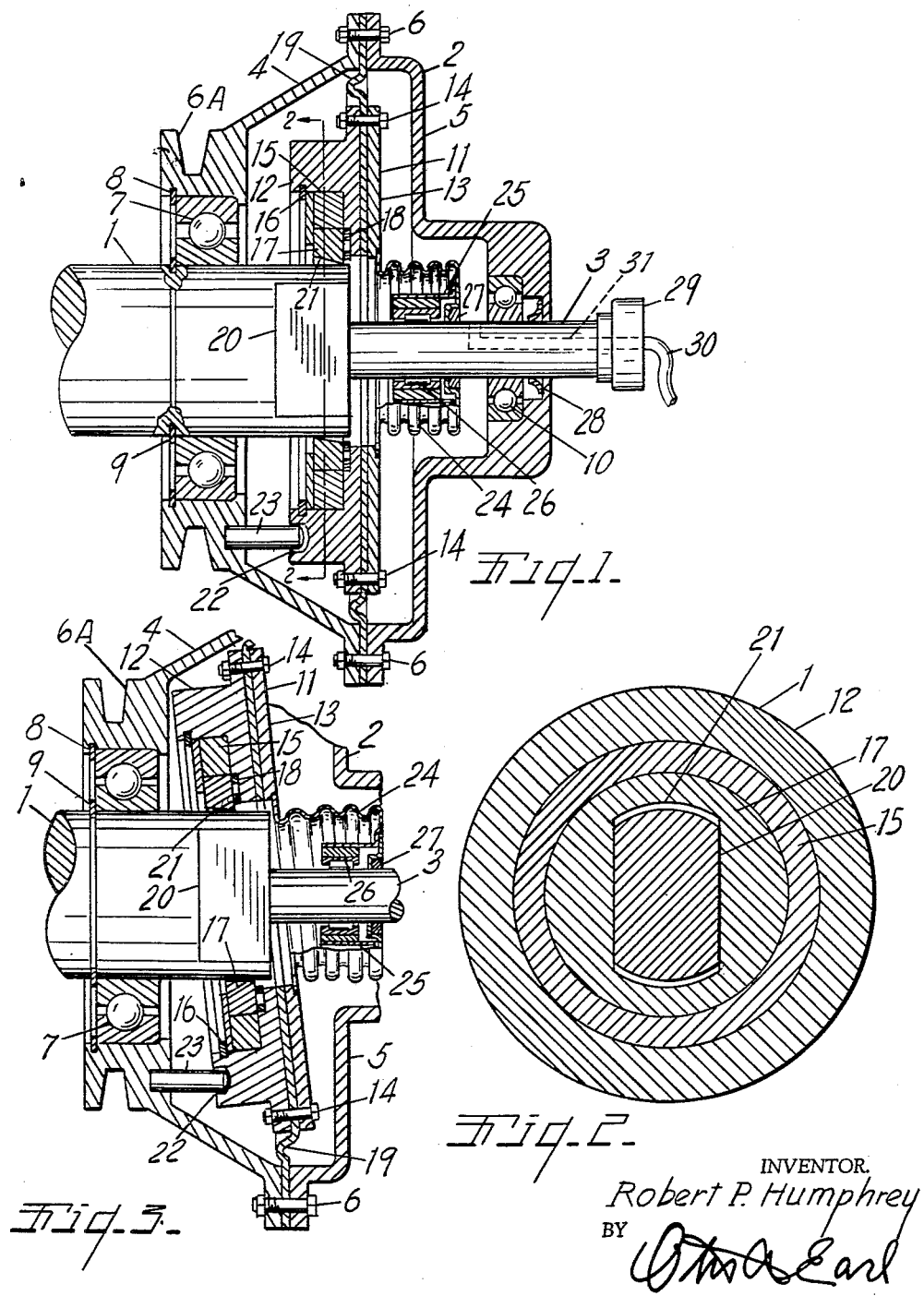
INVENTOR.
Robert P. Humphrey
BY
ATTORNEY.

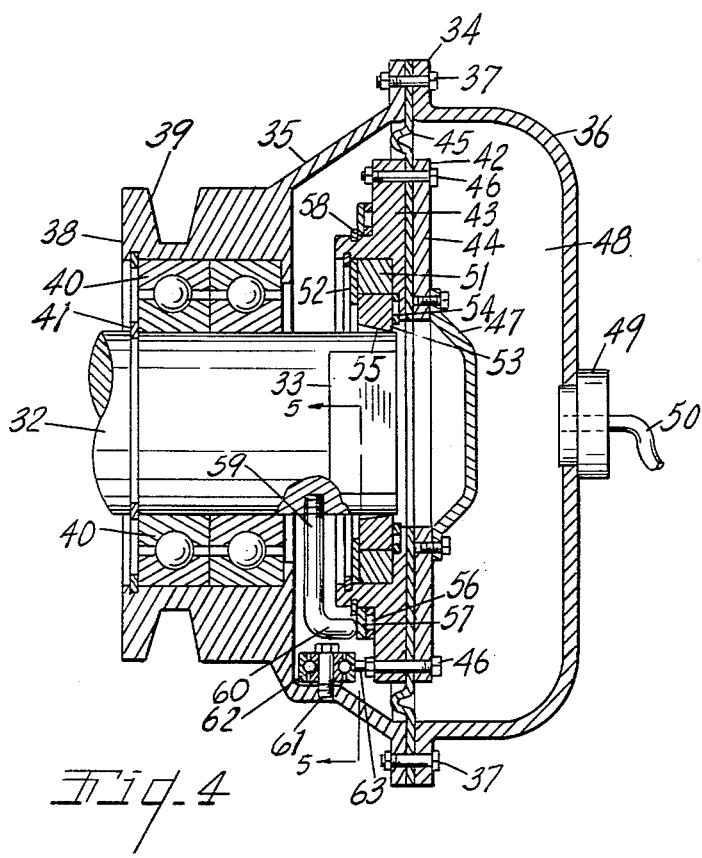
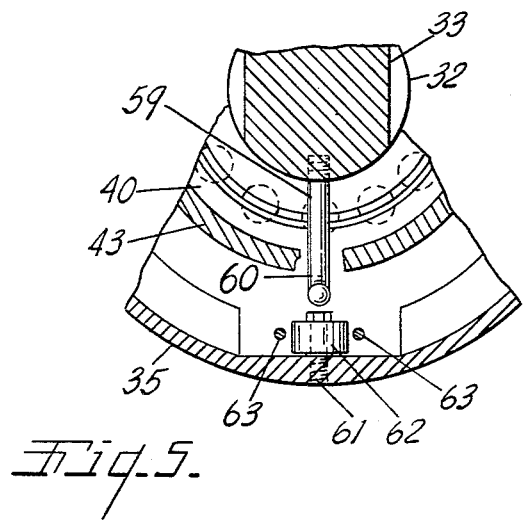

April 5, 1960 R. P. HUMPHREY 2,931,475
FLUID PRESSURE ACTUATED CLUTCH WITH TILTABLE PLATE
Filed Feb. 26, 1958 3 Sheets-Sheet 3
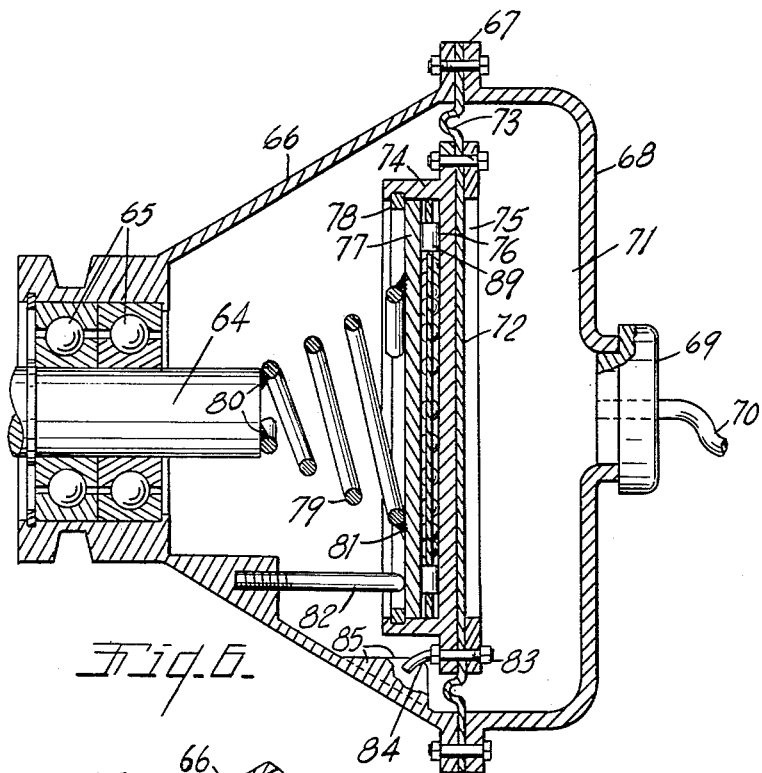
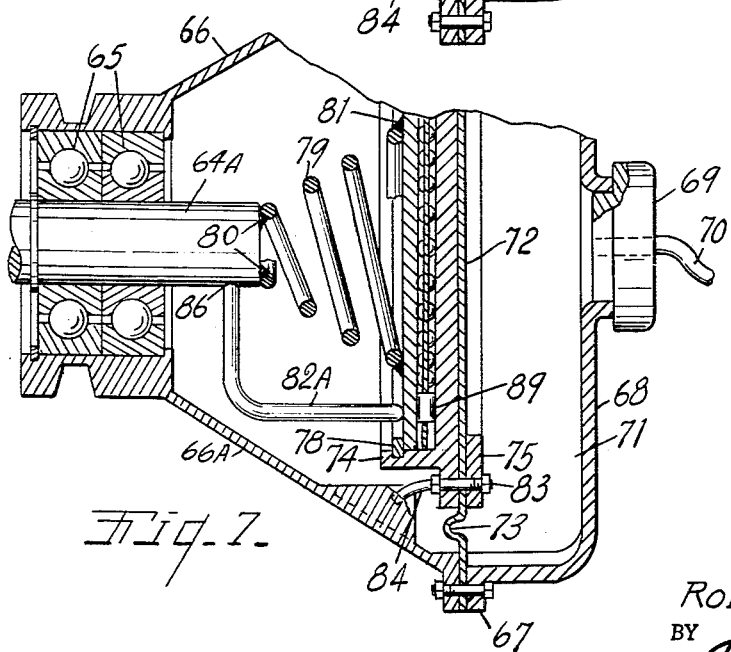
INVENTOR.
Robert P. Humphrey
BY
ATTORNEY.

United States Patent Office 2,931,475
Patented Apr. 5, 1960

2,931,475
FLUID PRESSURE ACTUATED CLUTCH WITH TILTABLE PLATE

Robert P. Humphrey, Kalamazoo, Mich., assignor to General Gas Light Company, Kalamazoo, Mich.

Application February 26, 1958, Serial No. 717,626

19 Claims. (Cl. 192—88)

This invention relates to improvements in a fluid pressure actuated clutch with tiltable plate.

The principal objects of this invention are:

First, to provide a novel form of clutch mechanism which can be remotely actuated by fluid pressure to instantly engage or release a driving connection between two relatively rotatable parts.

Second, to provide a clutch of the swash plate type which can be engaged in any relatively rotated position of its parts and in which relative rotation or friction between the driving and driven parts as the parts are moved into engaged driving position is accommodated and supported by rolling bearings which are at all times located in the plane of rotation of the clutching parts.

Third, to provide a clutch that is compact and highly resistant to wear due to the clutching parts being constantly engaged along anti-friction surfaces and being rendered operative and inoperative by simultaneous movement of the clutching parts in angular relation to the driving and driven members of the clutch.

Other objects and advantages of the invention will be apparent from a consideration of the following description and claims. The drawings, of which there are three sheets, illustrate four highly practical forms of the clutch mechanism.

Fig. 1 is a fragmentary longitudinal cross sectional view through a first form of the clutch in disengaged position.

Fig. 2 is a transverse cross sectional view taken along the plane of the line 2—2 in Fig. 1.

Fig. 3 is a fragmentary longitudinal cross sectional view similar to Fig. 1 but showing the clutch parts in engaged position.

Fig. 4 is a fragmentary axial cross sectional view through a second form of the clutch, the parts being illustrated in disengaged position.

Fig. 5 is a fragmentary transverse cross sectional view taken along the plane of the line 5—5 in Fig. 4.

Fig. 6 is a fragmentary axial cross sectional view through a third form of the clutch, the parts being illustrated in disengaged position.

Fig. 7 is a fragmentary axial cross sectional view through a fourth form of the clutch, the parts being illustrated in disengaged position.

The first form of the clutch comprises a shaft 1 and a rigid housing 2 which are relatively rotatable to each other and either of which may constitute the driving or driven element of the clutch. The shaft 1 has an end portion 3 of reduced diameter and the housing 2 is made up of two separate shells 4 and 5 bolted together as at 6. The shell 4 which embraces the end of the larger portion of the shaft has a pulley groove 6A formed around its periphery and constituting a driving connection for a part to be driven such as a belt not illustrated. The shell 4 is rotatably supported on the larger portion of the shaft by a roller bearing 7. Snap rings 8 and 9 hold the bearing races axially on the shell and the shaft respectively. The shell 5 of the housing is supported by a ball bearing 10 on the reduced end of the shaft so that the housing is coaxially aligned with the shaft and will rotate freely with respect thereto when the clutch is disengaged.

Positioned within the housing 2 and around the end of the enlarged portion of the shaft is a rigid partition 11 consisting of an inner bearing plate 12 and an outer clamp plate 13 secured together as by the bolts 14. The bearing plate 12 is internally shouldered to receive the journal bearing 15 secured in place by a snap ring 16. The journal bearing 15 rotatably supports an annular clutch ring 17. 18 is an axial thrust bearing assembly axially supporting the clutch ring 17.

The partition 11 is supported centrally within the housing by a flexible diaphragm 19 clamped between the shells 4 and 5 of the housing and between the bearing plate 12 and clamp plate 13. The partition 11 is further centrally but tiltably supported from the large portion of the shaft 1 by the clutch ring 17 that is rotatable in the journal bearing 15. The enlarged portion of the shaft has parallel flat surfaces 20 formed on its sides and the interior of the clutch ring 17 is formed with a hole having flat sides corresponding to the flat surfaces on the shaft and connected by arcuate ends conforming to the periphery of the circular portion of the shaft. The arcuate ends of the hole in the clutch ring are axially bevelled as at 21 so that the clutch ring can tilt on the enlarged portion of the shaft. The bearing plate 12 of the partition has an eccentric recess 22 formed in its inner face receiving the end of a pin 23 that forms an abutment between the partition and the shell 4 of the housing. The pin 23 also forms a rotary driving connection between the housing and the partition thus relieving the diaphragm 19 of torsional loads.

It will be noted that when the partition 11 and the clutch ring carried thereby are perpendicular to the shaft the shaft and clutch ring can rotate within the journal bearing 15 without transmitting driving force to the partition or the housing 2. When, however, the clutch ring 17 and partition 11 are tilted axially about the abutment 23 as shown in Fig. 3 rotation of the clutch ring within the journal bearing 15 is prevented because the axis of rotation of the clutch ring within the journal bearing is no longer coincident with the axis of the shaft 1. Rotation of either the shaft part 1 or the housing part 2 of the clutch will therefore drive the other part.

In order to effect axial movement and tilting of the partition 11 within the housing, the outer clamp plate 13 is connected at its radially inner edge to a tubular corrugated bellows 24 positioned around the smaller end 3 of the shaft. The outer end of the bellows 24 is connected to an axially inwardly turned sleeve 25 supporting a needle bearing 26 around the shaft 3. The bellows 24 is thus centered and supported from the shaft while being capable of flexing with tilting motion of the partition. The outer end of the bellows 24 also carries a pressure seal 27 rotatably engaged with the surface of the shaft 3. A seal 28 carried by the end of the shell 5 engages the shaft 3 to complete a sealed pressure chamber within the shell 5 at the outer end of the housing. The projecting end of the shaft 3 carries a rotating or running seal connection 29 to a pressure conduit 30 which may be connected to any suitable source of fluid pressure not illustrated, and in itself constitutes a source of pressure. The conduit 30 opens through the rotating seal 29 to a passage 31 formed axially in the shaft 3 to within the shell 5.

To engage the clutch from the neutral position illustrated in Fig. 1 pressure is admitted through the conduit 30 and passage 31 to within the shell 5 where it acts on the right or outer face of the partition 11 to force the partition to the left. The seals 27 and 28 prevent the escape of the pressure fluid and the abutment 23 causes the partition to tilt to the position shown in Fig. 3, while the bellows 24 flexes to prevent breaking of the fluid pressure seal at the seal 27. The clutch parts are then engaged and rotation of either the shaft part or the housing part will transmit rotating force to the other part.

In the modified form of the clutch illustrated in Figs. 4 and 5 the shaft 32 is provided with flatted portions 33 at its end and terminates adjacent the flats eliminating the reduced extension of the first form of the clutch. The housing 34 consists of an inner shell 35 and an outer shell 36 secured together by the bolts 37. The inner shell 35 has a thickened hub portion 38 in which the pulley groove 39 is formed. The hub 38 is rotatably supported on the shaft 32 by the double ball bearings 40 retained in place by the snap rings 41.

Within the housing 34 is a rigid partition 42 consisting of the inner bearing plate 43 and an outer clamp plate 44 clamped against the opposite sides of a flexible diaphragm 45 by the bolts 46. The centers of the plates 43 and 44 are cut away to clear the end of the shaft as the partition tilts but a closure plate 47 completes the partition across the end of the shaft to form a pressure chamber 48 within the housing.

The outer end shell 36 of the housing carries rotating seal 49 connected to a source of fluid pressure 50 for admitting fluid pressure into the chamber 48 to move the partition as will be described.

The inner bearing plate 43 of the partition is provided with a radially and axially facing shoulder against which a journal bearing 51 is secured by snap rings 52. Rotatably mounted within the journal bearing 51 is an annular clutch ring 53 similar to the clutch ring 17 in the first form of the invention. The clutch ring is supported axially from an inner flange of the bearing plate by an axial thrust bearing 54. The opening in the clutch ring has flat chordal sides engaged with the flats 33 on the end of the shaft. The arcuate inner edges of the clutch ring at the ends of the chordal sides are axially beveled as at 55 so that the clutch ring can tilt axially on the shaft while remaining in rotary driving engagement therewith.

Seated against a radially outwardly facing shoulder on the bearing plate are an axial thrust bearing 56 and an annular abutment ring 57. These are retained in place by the snap ring 58. Near the outer end of the shaft 32 there is provided a radially projecting pin 59 with a laterally and axially outwardly turned abutment end 60 bearing against the abutment ring 57. The pin 59 and abutment 60 turn with the shaft relative to the housing and the partition 42 with the abutment plate and thrust bearing 56 reducing friction between the parts but in any relatively rotated position of the shaft and housing such as is illustrated in Fig. 4 the abutment 60 forms an eccentric stop about which the partition 42 will tilt when pressure is admitted to the pressure chamber 48.

In order to relieve the flexible diaphragm 45 from torsional stress the inner shell 35 of the housing carries a pin 61 disposed radially with respect to the housing and supporting the roller bearing 62. Two of the bolts 46 which secure the plates 43 and 44 of the partition together are provided with stud-like extensions 63 disposed on opposite sides of the roller bearing 62 in angular torque transmitting relation thereto. Thus regardless of the tilted position of the partition 42 it is rotatably drivingly connected to the housing 34.

The second form of clutch operates in much the same manner as the first form described. When the partition 42 is perpendicular to the shaft 32 in response to the absence of pressure in the pressure chamber 48, the clutch ring 53 will rotate with the shaft 32 and in free antifriction engagement with the journal bearing 51 and thrust bearing 54. As previously pointed out the abutment 60 will rotate freely against the abutment ring 57. However, when pressure is admitted to the pressure chamber 48 the partition 42 will move inwardly in the housing 34 and due to engagement with the abutment 60 will tilt relative to the shaft 32. This brings the axis of rotation of the clutch ring 53 within the bearings 51 and 54 out of alignment with the axis of rotation of the shaft 32 so that the tilted clutch ring will not rotate relative to the partition and a driving connection is established between the shaft and the housing 34.

The modified third form of the clutch illustrated in Fig. 6 provides the shaft 64 with a double ball bearing 65 that supports the inner shell 66 of the housing 67 in much the same manner as the first two forms of the clutch. The housing 67 is completed by an outer shell 68 carrying a rotating seal 69. The seal is connected to a source of pressure 70 for admitting fluid pressure to the pressure chamber 71. The interior of the pressure chamber is closed off by a rigid partition 72 supported by the flexible diaphragm 73. The partition 72 consists of the inner bearing plate 74 and an annular clamp ring 75 clamped to opposite sides of the diaphragm.

The bearing plate 74 is formed with a radially and axially inwardly facing shoulder 76 within which is rotatably mounted a circular clutch plate 77. The clutch plate is retained by a snap ring 78 against the annular thrust bearing 89.

Instead of being connected to the shaft by a noncircular engagement therewith as in the first two forms of the clutch, the clutch plate 77 is permanently drivingly connected to the shaft by the conically coiled spring 79 that is welded to the shaft as at 80 and welded to the clutch plate as at 81. The clutch plate thus rotates with the shaft but is tiltable with respect thereto. When the clutch plate is perpendicular to the shaft it rotates freely within the bearing plate 74 without transmitting rotation to the bearing plate of the partition 72. However, when the partition 72 and clutch plate 77 are tilted relative to the axis of the shaft 64 the clutch plate will not rotate in the partition and a driving connection is formed.

In order to effect tilting of the partition within the housing the inner shell 66 of the housing is provided with an eccentrically located abutment pin 82 that abuts against the clutch plate 77 and acts through the clutch plate to tilt the partition as the partition is moved against the yieldable pressure of the spring 79 and the diaphragm 73 by pressure in the chamber 71. In order to relieve the diaphragm 73 from torque loads one of the bolts 83 that connect the bearing plate 74 with the clamp ring 75 is provided with a stud-like extension 84 projecting into driving engagement between two spaced abutments 85 on the inner shell 66 of the housing.

The fourth modified form of the clutch shown in Fig. 7 is substantially the same as the form shown in Fig. 6 except that the partition tilting abutment pin 82A is mounted on the shaft 64A as at 86 instead of on the housing shell 66A. The other parts of the clutch remain the same as in Fig. 6 and the description thereof will not be repeated. The clutch in Fig. 7 operates in the same way as the clutch in Fig. 6.

In all forms of the clutch a pair of relatively rotatably clutching parts are provided with antifriction surfaces permitting easy relative rotation between the parts and the two parts are then tiltably supported with their center of rotation coincident with the axis of rotation of two clutch members to be connected. One of the clutch parts is drivingly connected to one clutch member while the other clutch part is drivingly connected to the other clutch member without interfering with the tiltable connection of the clutch parts. When the axis of rotation of the inner clutch parts with respect to each other is coincident with the axis of rotation of the clutch members no driving connection is established but when the axis of rotation of the inner clutch parts is tilted relative to the axis of the outer clutch members there is an axial overlapping and locking engagement between the inner clutch parts that forms a driving connection between the clutch members to engage the clutch assembly.

Having thus described the invention, what is claimed as new and is desired to be secured by Letters Patent is:

1. A clutch comprising a shaft having a relatively large portion and a relatively small end portion, flatted surfaces on the end of the larger portion of said shaft, a rigid hollow two piece housing surrounding said shaft and having bearings rotatably engaging the large and small portions of the shaft, a pulley on the outside of said housing in the plane of the bearing engaging the large portion of the shaft, a rigid plate having a shouldered hole in the center passing said shaft, a flexible diaphragm connecting and sealing the periphery of said plate to said housing between the two parts thereof, a clutch ring rotatably mounted in said hole in said plate and having axial thrust engagement with the shoulder of said hole, said ring having straight internal chordal edges engaged with said flatted surfaces on the sides of the large portion of said shaft, the internal surface of said ring between said chordal edges being axially bevelled and providing clearance to permit tilting of the ring and plate, a tubular bellows positioned around said smaller part of said shaft and secured and sealed at its inner end to said plate, a bearing mechanically connected to the outer end of said bellows and rotatably engaged with said smaller portion of said shaft within the bellows, a pressure seal between the outer end of said bellows and said shaft, a second pressure seal between said housing and the smaller portion of said shaft, a rotating seal on the smaller end of said shaft connected to a source of pressure, said smaller portion defining a passage from said source to within said housing and between said first and second seals, and an eccentric abutment on the inside of said housing axially and non-rotatably engageable with the opposite side of said plate from said passage.

2. A clutch comprising a shaft having a relatively large portion and a relatively small end portion, flatted surfaces on the end of the larger portion of said shaft, a rigid hollow housing surrounding said shaft and having bearings rotatably engaging the large and small portions of the shaft, a pulley on the outside of said housing, a rigid plate having a shouldered hole in the center passing said shaft, a flexible diaphragm connecting and sealing the periphery of said plate to said housing, a clutch ring rotatably mounted in said hole in said plate and having axial thrust engagement with the shoulder of said hole, said ring having straight internal chordal edges engaged with said flatted surfaces on the sides of the large portion of said shaft, the internal surface of said ring between said chordal edges providing clearance to permit tilting of the ring and plate, a tubular bellows positioned around said smaller part of said shaft and secured and sealed at its inner end to said plate, a bearing mechanically connected to the outer end of said bellows and rotatably engaged with said smaller portion of said shaft, a pressure seal between the outer end of said bellows and said shaft, a second pressure seal between said housing and the smaller portion of said shaft, a rotating seal on the smaller end of said shaft connected to a source of pressure, said smaller portion defining a passage from said source to within said housing and between said first and second seals, and an eccentric abutment on the inside of said housing axially and non-rotatably engageable with the opposite side of said plate from said passage.

3. A clutch comprising a shaft having a relatively large portion and a relatively small end portion, a flatted surface on the end of the larger portion of said shaft, a rigid hollow two piece housing surrounding said shaft and having bearings at the outer ends of each half rotatably engaging the large and small portions of the shaft, a drive connection on the outside of the half of said housing engaged with the large portion of the shaft, a rigid plate having a hole in the center passing said shaft, a flexible diaphragm connecting and sealing the periphery of said plate to said housing between the two parts thereof, a clutch ring rotatably mounted in said hole in said plate and having axial thrust connections to the plate, said ring having a straight internal chordal edge engaged with said flatted surface on the side of the large portion of said shaft, the internal surface of said ring at the ends of said chordal edge being axially bevelled and providing clearance to permit tilting of the ring and plate, a tubular bellows positioned around said smaller part of said shaft and secured and sealed at its inner end to said plate, a bearing mechanically connected to the outer end of said bellows and rotatably engaged with said smaller portion of said shaft, a pressure seal between the outer end of said bellows and said shaft, a second pressure seal between said housing and the smaller portion of said shaft, a rotating seal on the smaller end of said shaft connected to a source of pressure, said smaller portion defining a passage from said source to within said housing and between said first and second seals, and an eccentric abutment on the inside of said housing axially and non-rotatably engageable with the opposite side of said plate from said passage.

4. A clutch comprising a shaft having a relatively large portion and a relatively small end portion, a flatted surface on the end of the larger portion of said shaft, a rigid hollow housing surrounding said shaft and having bearings at the outer ends of each half rotatably engaging the large and small portions of the shaft, a drive connection on the outside of the half of said housing engaged with the large portion of the shaft, a rigid plate having a hole in the center passing said shaft, a flexible diaphragm connecting and sealing the periphery of said plate to said housing, a clutch ring rotatably mounted in said hole in said plate and having axial thrust connections to the plate, said ring having a straight internal chordal edge engaged with said flatted surface on the side of the large portion of said shaft, the internal surface of said ring at the ends of said chordal edge providing clearance to permit tilting of the ring and plate, a tubular bellows positioned around said smaller part of said shaft and secured and sealed at its inner end of said plate, a bearing mechanically connected to the outer end of said bellows and rotatably engaged with said smaller portion of said shaft, a pressure seal between the outer end of said bellows and said shaft, a second pressure seal between said housing and the smaller portion of said shaft, a rotating seal on the smaller end of said shaft connected to a source of pressure, said smaller portion defining a passage from said source to within said housing and between said first and second seals, and an eccentric abutment on the inside of said housing axially engageable with the opposite side of said plate from said passage.

5. A clutch comprising a shaft, non-concentric surfaces on said shaft a rigid hollow two piece housing surrounding said shaft and having bearings at the ends of the housing rotatably engaging the shaft, a pulley on the outside of said housing in the plane of one of the bearings, a rigid plate having a hole in the center passing said shaft, a flexible diaphragm connecting and sealing the periphery of said plate to said housing between the two parts thereof, a clutch ring rotatably mounted in said hole in said plate and having axial thrust connections with the plate, said ring having a non-concentric internal edge engaged with said non-concentric surfaces on the sides of said shaft, the internal surface of said ring providing clearance to permit tilting of the ring and plate, a tubular bellows positioned around said shaft and secured and sealed at its inner end to said plate, a bearing mechanically connected to the outer end of said bellows and rotatably engaged with said shaft within the bellows, a pressure seal between the outer end of said bellows and said shaft, a second pressure seal between the end of said housing adjacent said first pressure seal and said shaft, a rotating seal on said shaft connected to a source of pressure, said shaft defining a passage from said source to within said housing and between said first and second seals, and an eccentric abutment on the inside of said housing axially and non-rotatably engageable with the opposite side of said plate from said passage.

6. A clutch comprising a shaft, non-concentric surfaces on said shaft a rigid hollow housing surrounding said shaft and having bearings at the ends of the housing rotatably engaging the shaft, a pulley on the outside of said housing, a rigid plate having a hole in the center passing said shaft, a flexible diaphragm connecting and sealing the periphery of said plate to said housing, a clutch ring rotatably mounted in said hole in said plate and having axial thrust connections with the plate, said ring having non-concentric internal edge engaged with said non-concentric surfaces on the sides of said shaft, the internal surface of said ring providing clearance to permit tilting of the ring and plate, a tubular bellows positioned around said shaft and secured and sealed at its inner end to said plate, a bearing mechanically connected to the outer end of said bellows and rotatably engaged with said shaft, a pressure seal between the outer end of said bellows and said shaft, a second pressure seal between the end of said housing adjacent said first pressure seal and said shaft, a rotating seal on said shaft connected to a source of pressure, said shaft defining a passage from said source to within said housing and between said first and second seals, and an eccentric abutment on the inside of said housing axially engageable with the opposite side of said plate from said passage.

7. A clutch comprising a shaft, non-concentric surfaces on said shaft, a rigid hollow housing surrounding said shaft and having bearings at its ends rotatably engaging the shaft, a drive connection on the outside of said housing, a rigid plate having a hole in the center passing said shaft, a flexible diaphragm connecting and sealing the periphery of said plate to said housing, a clutch ring rotatably mounted in said hole in said plate and having axial thrust connections to the plate, said ring having a non-concentric internal edge engaged with said non-concentric surfaces on the sides of said shaft, the internal surface of said ring providing clearance to permit tilting of the ring and plate, means forming a flexible seal positioned around said shaft and secured and sealed at its radially outer edge to said plate, a bearing mechanically connected to the inner edge of said flexible seal and rotatably engaged with said shaft, a second seal between the end of said housing and said shaft, a rotating seal on the end of said shaft connected to a source of pressure, said shaft defining a passage from said source to within said housing and between said first and second seals, and means forming an eccentric abutment between the inside of said housing and the opposite side of said plate from said passage.

8. A clutch comprising a shaft, non-concentric surfaces on said shaft, a rigid hollow housing surrounding said shaft and having a bearing rotatably engaging the shaft, a drive connection on the outside of said housing, a rigid plate having a hole in the center passing said shaft, a flexible diaphragm connecting and sealing the periphery of said plate to said housing, a clutch ring rotatably mounted in said hole in said plate and having axial thrust connections to the plate, said ring having a non-concentric internal edge engaged with said non-concentric surfaces on the sides of said shaft, the internal surface of said ring providing clearance to permit tilting of the ring and plate, means forming a flexible seal positioned around said shaft and secured and sealed at its radially outer edge to said plate, a second seal between the end of said housing and said shaft, a rotating seal on the end of said shaft connected to a source of pressure, said shaft defining a passage from said source to within said housing and between said first and second seals, and means forming an eccentric abutment between the inside of said housing and the opposite side of said plate from said passage.

9. A clutch comprising a shaft, a housing rotatably supported on said shaft and having an exterior drive connection for a part to be rotated therewith, a flatted side on said shaft within said housing, an annular partition within said housing and embracing said shaft, a flexible connection sealing the periphery of said partition to the inside of said housing, a second flexible connection sealing the radially inner edge of said partition to the surface of said shaft, a clutch ring rotatably supported by said partition concentric to said shaft and having a flat interior surface nonrotatably engaging the flatted side on said shaft, said ring being tiltable with said partition relative to said shaft, a pressure seal sealing one end of said shaft to said housing, rotatable seal means on the end of said shaft forming a connection to a source of fluid pressure to said housing between said sealing connections to said partition and said pressure seal, and an abutment between said partition and said housing eccentric to said shaft on the opposite side of the partition from said fluid pressure connection, said abutment forming a rotary driving connection between said housing and said partition.

10. A clutch comprising a shaft, a housing rotatably supported on said shaft and having an exterior drive connection for a part to be rotated therewith, a flatted side on said shaft within said housing, an annular partition within said housing and embracing said shaft, a flexible connection sealing the periphery of said partition to the inside of said housing, a second flexible connection sealing the radially inner edge of said partition to the surface of said shaft, a clutch ring rotatably supported by said partition concentric to said shaft and having a flat interior surface nonrotatably engaging the flatted side on said shaft, said ring being tiltable with said partition relative to said shaft, a pressure seal sealing one end of said shaft to said housing, rotatable seal means forming a connection to a source of fluid pressure to said housing between said sealing connections to said partition and said pressure seal, and an abutment between said partition and said housing eccentric to said shaft on the opposite side of the partition from said fluid pressure connection, and means forming a rotary driving connection between said housing and said partition.

11. A clutch comprising a shaft, a housing rotatably supported on said shaft and having an exterior drive connection for a part to be rotated therewith, a non-concentric side on said shaft within said housing, an annular partition within said housing and embracing said shaft, a flexible connection sealing the periphery of said partition to the inside of said housing, a second flexible connection sealing the radially inner edge of said partition to the surface of said shaft, a clutch ring rotatably supported by said partition concentric to said shaft and having a non-concentric interior surface nonrotatably engaging the non-concentric side on said shaft, said ring being tiltable with said partition relative to said shaft, a pressure seal sealing one end of said shaft to said housing, a rotatable seal means forming a connection between a source of fluid pressure and said housing between said sealing connections to said partition and said pressure seal, and an abutment between said partition and said housing eccentric to said shaft on the opposite side of the partition from said fluid pressure connection.

12. A clutch comprising relatively rotatable driving and driven members, one of said members being mounted upon the other and coaxial therewith, means forming a housing on said one of said members rotatable therewith coaxially with the other member, a flexible diaphragm mounted transversely of said housing to define a pressure chamber in one end of the housing, a rotatable seal and pressure connection on said housing arranged to admit fluid pressure to said chamber, a rigid plate forming a first clutch part secured to said diaphragm in spaced relation to its periphery, a second clutch part relatively nonrotatably and tiltably connected to said other of said members and positioned in opposed lapped relation to said first clutch part, means on said first and second clutch parts holding the same in co-planar relatively rotatable positions, a thrust bearing positioned between said first and second clutch parts, means including a pin secured to said one of said members forming an abutment between said plate and said one of said members and located eccentrically to the axis of rotation thereof, and means in addition to said diaphragm forming a rotary driving connection between said plate and said one of said members.

13. A clutch comprising relatively rotatable driving and driven members, one of said members being mounted upon the other and coaxial therewith, means forming a housing on said one of said members rotatable therewith coaxially with the other member, a flexible diaphragm mounted transversely of said housing to define a pressure chamber in one end of the housing, a rotatable seal and pressure connection on said housing arranged to admit fluid pressure to said chamber, a rigid plate forming a first clutch part secured to said diaphragm in spaced relation to its periphery, a second clutch part relatively non-rotatably and tiltably connected to said other of said members and positioned in opposed lapped relation to said first clutch part, means on said first and second clutch parts holding the same in co-planar relatively rotatable positions, a thrust bearing positioned between said first and second clutch parts, and means forming an abutment between said plate and said one of said members and located eccentrically to the axis of rotation thereof.

14. A clutch comprising relatively rotatable driving and driven members, one of said members being mounted upon the other and coaxial therewith, means forming a housing on said one of said members rotatable therewith coaxially with the other member, a flexible diaphragm mounted transversely of said housing to define a pressure chamber in one end of the housing, a rotatable seal and pressure connection arranged to admit fluid pressure to said chamber, a rigid plate forming a first clutch part secured to said diaphragm in spaced relation to its periphery, a second clutch part tiltably connected to said other of said members and positioned in opposed lapped relation to said first clutch part, means on said first and second clutch parts holding the same in co-planar relatively rotatable positions, and means forming an abutment between said plate and said one of said members and located eccentrically to the axis of rotation thereof.

15. A clutch comprising relatively rotatable driving and driven members, said members being coaxial, means forming a housing on one of said members rotatable therewith coaxially with the other member, a flexible diaphragm mounted transversely of said housing to define a pressure chamber in one end of the housing, a rotatable seal and pressure connection on said housing arranged to admit fluid pressure to said chamber, a rigid plate forming a first clutch part secured to said diaphragm in spaced relation to its periphery, a second clutch part relatively non-rotatably and tiltably connected to said other of said members and positioned in opposed lapped relation to said first clutch part, means on said first and second clutch parts holding the same in co-planar relatively rotatable positions, means forming an abutment between said plate and one of said members and located eccentrically to the axis of rotation thereof, and means in addition to said diaphragm forming a rotary driving connection between said plate and said one of said members.

16. A clutch comprising relatively rotatable and coaxial driving and driven members, means forming a housing on said one of said members rotatable therewith coaxially with the other member, a flexible diaphragm mounted in said housing to define a pressure chamber in one end of the housing, a pressure connection on said housing arranged to admit fluid pressure to said chamber, a rigid plate forming a first clutch part secured to said diaphragm in spaced relation to its periphery, a second clutch part drivingly and tiltably connected to said other of said members and positioned in opposed lapped relation to said first clutch part, means holding said first and second clutch parts in co-planar relatively rotatable positions, and means on one of said members forming an abutment between said plate and said one of said members and located eccentrically to the axis of rotation thereof.

17. A clutch comprising relatively rotatable driving and driven members, said members being coaxial, means forming a housing on one of said members rotatable therewith coaxially with the other member, a flexible diaphragm mounted in said housing to define a pressure chamber in one end of the housing, a rotatable seal and pressure connection arranged to admit fluid pressure to said chamber, a rigid plate forming a first clutch part secured to said diaphragm in spaced relation to its periphery, a second clutch part relatively non-rotatably and tiltably connected to said other of said members and positioned in opposed lapped relation to said first clutch part, means holding said first and second clutch parts in co-planar relatively rotatable positions, and means forming an abutment between said plate and one of said members and located eccentrically to the axis of rotation thereof.

18. A clutch comprising driving and driven members, one of said members forming a housing enclosing part of the other member, means holding said members in coaxial relation, a first clutch part drivingly connected with one of said members and tiltable with respect thereto within said housing, said first clutch part extending transversely across the axis of rotation of said members, a second clutch part relatively rotatably mounted on said first clutch part and in thrust transmitting parallel relation thereto, a flexible partition connected between said second clutch part and said housing and forming a chamber in said housing, means drivingly connecting said second clutch part to the other of said members, and means including a source of pressure connected to said chamber and an eccentric abutment between said clutch parts and one of said members arranged to selectively position said clutch parts in transverse perpendicular relation or inclined relation to the axis of rotation of said members, said means forming the driving connection between said second clutch part and said other member consisting of a coil spring arranged axially of said members and drivingly connected at its ends to the second clutch part and said other of said members.

19. A clutch comprising driving and driven members, one of said members forming a housing enclosing part of the other member, means holding said members in coaxial relation, a first clutch part drivingly connected with one of said members and tiltable with respect thereto within said housing, said first clutch part extending transversely across the axis of rotation of said members, a second clutch part relatively rotatably mounted on said first clutch part and in thrust transmitting parallel relation thereto, a flexible partition connected between said second clutch part and said housing and forming a chamber in said housing, means drivingly connecting said second clutch part to the other of said members, and means including a source of pressure connected to said chamber and an eccentric abutment between said clutch parts and one of said members arranged to selectively position said clutch parts in transverse perpendicular relation or inclined relation to the axis of rotation of said members, said means forming the driving connection between said second clutch part and said other member consisting of a spring arranged axially of said members and drivingly connected at its ends to the second clutch part and said other of said members.

References Cited in the file of this patent

UNITED STATES PATENTS

| 2,103,791 | Pepper | Dec. 28, 1937 |
| 2,589,291 | Sanford | Mar. 18, 1952 |
| 2,830,685 | Humphrey | Apr. 15, 1958 |

FOREIGN PATENTS

| 291,879 | Great Britain | June 11, 1928 |